June 24, 1930.    J. E. BROWN    1,766,279
FISHHOOK AND WEED GUARD
Filed Oct. 24, 1928

Inventor
J. E. Brown
By Lacey & Lacey, Attorneys

Patented June 24, 1930

1,766,279

UNITED STATES PATENT OFFICE

JOHN E. BROWN, OF ELYRIA, OHIO

FISHHOOK AND WEED GUARD

Application filed October 24, 1928. Serial No. 314,741.

This invention relates to fishing and trapping and more particularly to a fish hook having a weed guard applied thereto.

There are certain fish which prefer portions of a stream or lake having grass and other vegetation growing therein and it has been found difficult to catch these fish as when a fish line is cast into the water and reeled in the grass and weeds will catch upon a hook and not only prevent a fish from taking the bait but very often cause the bait to be torn loose from the hook.

Therefore, one object of the invention is to provide a fish hook having a guard applied thereto which will serve to prevent grass and weeds from catching upon the hook when it is drawn through the water.

Another object of the invention is to so form the guard that, while it will shield the sharpened end or prong of the hook, it will be yieldable and thereby allowed to be moved away from the prong when a fish attempts to take the bate and not interfere with catching the fish.

Another object of the invention is to so form the prong-engaging portion of the guard that, when it is desired to use an unguarded hook, the prong-engaging portion of the guard may be engaged with the shank of the hook and releasably retain the guard in an inoperative position.

Another object of the invention is to provide a device of this character which may be easily applied to a fish hook of a conventional construction and to further so form the device that in addition to serving as a guard it may also serve as means for engaging the bait applied to the hook and prevent the bait from slipping out of its proper position upon the hook.

The invention is illustrated in the accompanying drawing, wherein

Figure 1:
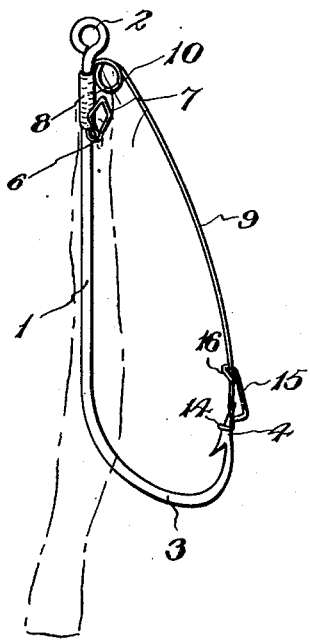
Figure 2:
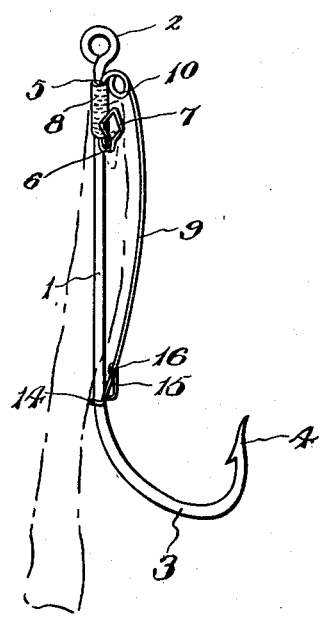
Figure 3:
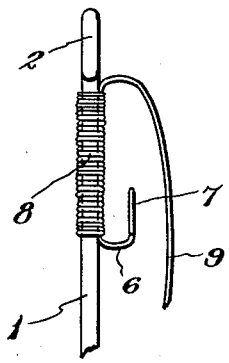
Figure 4:
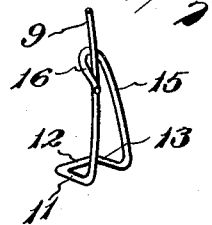

Figure 1 is a perspective view of a hook provided with the improved guard and bait holder with the guard in an operative position, Fig. 2 is a similar view showing the guard secured in an inoperative position, Fig. 3 is an enlarged view of the upper end portion of the hook and guard, and Fig. 4 is an enlarged perspective view of the lower portion of the guard.

The fish hook to which the improved guard has been shown applied is of a conventional construction and includes a shank 1 having a line-engaging eye 2 at its upper end and at its lower end merging into a bill 3 which terminates in a prong 4 at its free end. It will be understood that, if so desired, a hook having a snell connected therewith instead of being formed with an eye 2 may be used in place of the hook illustrated. The improved guard and bait holder consist of a strand of resilient wire which has one end portion doubled and bent to form an attaching shank 5 from the lower end of which extends a hook 6 terminating in an enlarged head 7 formed by spreading the doubled portion of the strand. This attaching shank is of such length that, when it is applied to the shank 1 of the hook, it may be bound firmly against the shank of the hook by a wrapping of wire 8 to which solder is applied in order to very firmly anchor the attachment to the shank of the fish hook. When the attachment is applied to the fish hook, the hook 6 will project from the shank 1, as shown in Fig. 3, and a strip of bacon rind or similar bait may be applied to the hook and have its upper end formed with a slide through which the hook 6 is passed. The head 7 of the hook extends transversely of the shank and, therefore, it will prevent the strip of bait from working loose from the hook 6 and sliding out of its proper position with respect to the fish hook. After the attaching shank 5 has been formed the strand of wire is bent to form an arm 9 which extends downwardly from the upper end of the shank and diverges from the shank of the fish hook. In the preferred form, the strand is coiled to provide a spiral spring 10 which adds to the resiliency of the arm 9, as shown in Figs. 1 and 2, but this coil may be omitted if so desired as shown in Fig. 3. At the lower end of the arm 9 which is of sufficient length to extend slightly beyond the point of the prong 4 the strand is bent inwardly, as shown at 11, and then transversely, as shown at 12, and outwardly, as shown at 13, to form an abutment head 14 from which projects an upwardly extending arm 15 terminating in a hook 16 at its upper end. This hook is left open, as shown in Fig. 4, and is of such dimensions that it can be easily engaged with the arm 9 but will not be liable to easily slip out of engagement therewith. It should be noted that the hook 16 when engaged with the arm will be disposed at such a distance from the lower end thereof that it will be disposed in spaced relation to the sharpened free end of the prong 4 when the guard is in engagement therewith, as shown in Fig. 1.

When the fish hook is in use, the bait is applied, as shown in Figs. 1 and 2, with the hook passed through an opening formed in the bait intermediate the length thereof and the upper end of the bait formed with a slide or opening in which is engaged the hook 6. Therefore, the bait will be suspended upon the fish hook and it cannot work longitudinally thereof out of its proper position when the fish hook is drawn through the water by reeling a line in after casting or when trolling from a moving boat. After the bait has been applied, the guard is engaged with the prong of the hook and when disposed in this operative position the cross bar 12 of the abutment 14 will bear against the inner surface of the prong a short distance below the upper end thereof. This will dispose the arm of the guard, as shown in Fig. 1, and when the hook is drawn through the water weeds or grass will be guided away from the fish hook by the guard and prevented from catching across the bill 3 of the fish hook. Therefore, the fish hook will not only be prevented from becoming fouled by grass and other weeds but will also be prevented from catching in the stalks of growing vegetation. When a fish attempts to take the bait, the hook enters the fish's mouth and as the fish closes its mouth about the bait the pressure exerted against the arm 9 will force the arm towards the shank of the hook away from the prong and this will leave the prong free so that it can be embedded in the fish and prevent the fish from escaping in the usual manner.

When fishing in water free from grass and weeds, it is not necessary to use a guard and, therefore, the guard is pressed away from the prong of the fish hook towards its shank. The arm 15 is moved to release its hook 16 from the arm of the guard either before or after the arm has been pressed toward the shank of the fish hook and after the lower end of the arm 9 has been swung past the shank of the fish hook pressure is applied to the arm 15 transversely thereof to move the arm 15 away from the arm 9 and allow the shank of the fish hook to pass between the arms 9 and 15 to the position shown in Fig. 2. When in this position, the hook 16 is again engaged with the arm 9 and the guard will be securely retained in its inoperative position. When in this position, the lower end of the arm which is engaged about the shank of the fish hook will serve as additional means to retain the bait in place in case the hook 6 should in some way become detached from the upper end of the bait. I have, therefore, provided a fish hook having an attachment which serves as a guard for the prong of the fish hook and also serves as means to retain bait in proper position when applied to the fish hook.

Having thus described the invention, I claim:

1. A fish hook having a shank and a bill terminating in a prong at its free end, and a guard of resilient material secured to said shank and extending downwardly away from the shank and provided with means for bearing against said prong when in an operative position and encircling the shank to releasably retain the guard in an inoperative position.

2. A fish hook having a shank and a bill terminating in a prong at its free end, and a guard for the hook secured to said shank and extending downwardly in diverging relation thereto and terminating in an abutment to bear against said prong when the guard is disposed over the prong in an operative position, said abutment being adapted to encircle the shank and releasably hold the guard in an inoperative position.

3. A fish hook having a shank and a bill terminating in a prong at its free end, and a guard for the hook secured to said shank and extending downwardly in diverging relation thereto and having its free end portion bent transversely and upwardly to form an abutment adapted to bear against said prong and retain the guard in shielding relation to the hook, the bent portion being also adapted to encircle the shank and retain the guard in an inoperative position.

4. A fish hook having a shank and a bill terminating in a prong at its free end, and a guard for the hook secured to said shank and extending downwardly in diverging relation thereto and having its free end portion bent transversely to form a side arm adapted to bear against the prong and then upwardly and terminating in a bill to encircle the main portion of the guard and releasable therefrom whereby the bent end portion of the guard may be engaged about the shank of the hook to releasably retain the guard in an inoperative position.

5. A fish hook having a shank and a bill terminating in a prong at its free end, bait-engaging means adjacent the upper end of said shank, and a guard extending from the shank above the bait-engaging means, said guard diverging downwardly from the shank out of engagement with the bait engaging means and terminating in an abutment to bear against said prong.

6. A fish hook having a shank and a bill terminating in a prong at its free end, and a strand of resilient wire secured against the upper portion of the shank longitudinally thereof with its lower end bent outwardly and upwardly to form a bait-engaging member having an enlarged head, said strand being bent outwardly and downwardly from the upper end of its attached portion to form a guard arm diverging from the hook and having its lower end portion bent to form an open head adapted to engage about said prong and prevent accidental separation of the guard and bill.

7. A fish hook having a shank and a bill terminating in a prong at its free end, and a strand of resilient wire secured against the upper portion of the shank longitudinally thereof with its lower end bent outwardly and upwardly to form a bait-engaging member, said strand being bent outwardly and downwardly from the upper end of its attached portion to form a guard arm diverging from the hook and having its lower end portion bent transversely to form a side arm adapted to bear against the prong and then upwardly to form a latching arm terminating in a hooked end to engage about the main portion of the strand.

In testimony whereof I affix my signature.

JOHN E. BROWN. [L. S.]